United States Patent [19]
Jobst

[11] Patent Number: 5,296,293
[45] Date of Patent: Mar. 22, 1994

[54] PARTICULATE MATERIAL SUITABLE FOR THE REMOVAL OF HEAVY METALS
[75] Inventor: Wolfram Jobst, Wilmington, Del.
[73] Assignee: E. I. Du Pont de Nemours and Company, Wilmington, Del.
[21] Appl. No.: 812,000
[22] Filed: Dec. 23, 1991
[51] Int. Cl.$^5$ .............................................. B32B 5/16
[52] U.S. Cl. .......................... 428/403; 210/500.27; 210/500.42; 210/688; 210/728; 210/767; 210/777; 210/912; 428/407
[58] Field of Search ................. 428/402, 403, 407; 210/271, 912, 688, 500.4, 665, 666, 602, 614, 767, 777, 728, 500.27; 423/99, 100, 106, 529

[56] References Cited

U.S. PATENT DOCUMENTS 4,829,045  5/1989  Fransham .......................... 502/401

FOREIGN PATENT DOCUMENTS

| 27467 | 4/1984 | Australia . |
| 8427467 | 12/1987 | Australia . |
| 0119925 | 9/1984 | European Pat. Off. . |
| 56-021777 | 5/1981 | Japan . |
| 56-21777 | 5/1981 | Japan . |
| 56-31317 | 7/1981 | Japan . |
| 56-031317 | 7/1981 | Japan . |
| 57-067515 | 4/1982 | Japan . |
| 62-50200 | 10/1987 | Japan . |
| 62-050200 | 10/1987 | Japan . |
| 2063228 | 6/1981 | United Kingdom . |
| 9105859 | 5/1991 | World Int. Prop. O. . |

OTHER PUBLICATIONS

"Treatment of Metal Finishing Wastewater with Peat Moss Contact Column"–Slocum, Blanc and O'Shaughnessy–pp. 364-376–Pub. Date 1987.
OP 11-92. Biosorption of Metal Contaminants From Acidic Mine Waters, by C. R. Ferguson and T. H. Jeffers.
Corwin, Richard R. and Jeffers, Tom H., Conf. Proc. for Assoc. for Abandoned Mine Land Programs 1991, 13th annual, "Biosorption of Metal Comtaminants from Acidic Mine Waters", pp. 184-193.
Ferguson, C. R. and Jeffers, T. H., 1991 SME Annual Meeting, Feb. 25, 1991, "Biosorption of Metal Contaminants from Acidic Mine Waters".
Jeffers, T. H., Ferguson, C. R., and Bennett, P. G., U.S. Department of the Interior, Bureau of Mines, Report of Investigations 9340, 1991, "Biosorption of Metal Contaminants Using Immobolized Biomass—A Laboratory Study".
G. V. Cullen et al., *Water Res.* "Removing Metals From Waste Solutions with Low Rank Coals and Related Materials" 16:1357-1366 (1982).
C. R. Ferguson et al., "Biosorption of Metal Contaminants from Acidic Mine Waters", published in a paper at the 1991 Society of Mining Engineers (SME) Annual Meeting, Feb. 25, 1991 in Denver, Colo.
E. M. Trujillo et al., "Mathematically Modeling the Removal of Heavy Metals from a Wastewater Usiong Immobilized Biomass", published in *Environmental Science and Technology*, vol. 25, No. 9, 1559-65 (1991).
C. H. Fuchsman, *Peat Industrial Chemistry and Technology*, Chapter 12, "Humic Acids and Lignins", pp. 136-160, Academic Press (1980).

*Primary Examiner*—Paul J. Thibodeau
*Assistant Examiner*—H. Thi Le

[57] ABSTRACT

A particulate material suitable for the removal of heavy metals from an aqueous effluent comprises a finely ground solid encapsulated in a microporous shell of a polyvinyl chloride. The solid may be peat. The shell comprises a sufficient amount of polyvinyl chloride to utilize the adsorptive qualities of the peat while imparting structural integrity thereto. A process for making the particulate material comprises the steps of dissolving a polyvinyl chloride in an organic solvent therefor to produce a polymer solution, combining the polymer solution with a solid to produce a homogenous dispersion, forming droplets from the dispersion and contacting the droplets with water to precipitate out a particulate material comprising a finely ground solid encapsulated in a microporous shell of the polyvinyl chloride. The material may be modified after the solid is encapsulated, or the solid of the material may be modified before it is encapsulated. The material or the peat is modified with a calcium salt, such as calcium carbonate, or a sodium salt, such as sodium hydroxide. Raw peat which is modified with a calcium salt, preferably calcium carbonate, is also suitable for the removal of heavy metals from an aqueous effluent.

4 Claims, 11 Drawing Sheets

PARTICULATE MATERIAL SUITABLE FOR THE REMOVAL OF HEAVY METALS

BACKGROUND OF THE INVENTION

1. Field of the Invention

The present invention relates to a particulate material suitable for the removal of heavy metals from an aqueous effluent, a process for making the material and a system and a method for removing heavy metals from an aqueous effluent using the particulate material. 2. Description of the Related Art Raw wastewater generated by industry and contaminated ground water contain substantial concentrations of metal ions, oxides, cyanides and other substances. Common pre-treatment techniques of wastewater or ground water typically involve flocculation, hydroxide or sulfide precipitation, clarification and pH adjustment of the water.

A number of in-line modifications of the usual pre-treatment techniques or substitution of less toxic oxidants or cleaners can be employed successfully to reduce or eliminate residual contaminants. However, these techniques often do not remove all the metals from the wastewater. Consequently, levels exceeding legislated discharge standards are common. Moreover, these techniques are often complicated and/or are expensive to employ.

Because of the large metal removal capacity and the natural abundance of peat, peat adsorption is potentially a cheap and effective technique for treating wastewater or contaminated ground water. Various chemical and physical properties of peat allow it to actively adsorb dissolved and colloidal metals from industrial effluents. Furthermore, peat can adsorb cyanide and other organic compounds from water containing heavy metals.

However, peat adsorption is not without its disadvantages. Peat, in its natural form, is composed of strands which are stringy and messy. Thus, natural or raw peat tends to be difficult to handle. Also, the hydraulic resistance of raw peat is high. Moreover, when packed in a column, the fines in the raw peat tend to be washed out, and the peat bed in the column tends to be compacted.

The Bureau of Mines has turned to the use of polysulfone as an encapsulant material for peat moss, as discussed by C. R. Ferguson et al. in "Biosorption of Metal Contaminants from Acidic Mine Waters", published in a paper at the 1991 Society of Mining Engineers (SME) Annual meeting, Feb. 25, 1991, in Denver, Co., and by E. M. Trujillo et al., in a paper entitled "Mathematically Modeling the Removal of Heavy Metals from a Wastewater Using Immobilized Biomass", published in *Environmental Science and Technology*, Vol. 25, No. 9, 1559-65 (1991).

Recognizing the high cost of polysulfone as an encapsulant, particularly for large quantity use in the field, whether bagged or for use in a packed bed column or a stirred reactor, an improved, a less expensive polymer encapsulant and a process for encapsulating peat in this polymer are needed. Ideally, such an encapsulant would also have good porosity in order to fully utilize the adsorptive qualities of the peat while imparting the needed structural integrity thereto.

Also, experiments have shown that enhanced ion exchange properties can be derived from materials with high peat loadings (~80% by weight of dry particulate solids), provided such loading does not exceed an encapsulants'ability to contain the peat. Thus, a particulate material having a high peat loading and a process for forming this material are needed.

Alternatively, it may be economical to utilize the adsorptive qualities of the peat without encapsulating it. Thus, there exists a need to enhance the adsorptive qualities of peat in its raw form.

SUMMARY OF THE INVENTION

Accordingly, it is an object of the present invention to stabilize peat or a finely ground solid so as to render them much more useful for the removal of heavy metals from an aqueous effluent by encapsulating them in a shell of polyvinyl chloride to utilize the adsorptive qualities of the peat or the solid while imparting structural integrity thereto.

It is an additional object of the present invention to provide a method to improve the adsorptive qualities of the peat by either modifying it in its raw form or by modifying it during the encapsulation process or after it has been encapsulated. It is also an additional object to modify the solid during the encapsulation process or after it has been encapsulated to improve the adsorptive qualities of the solid.

In order to achieve the foregoing objects, there is provided, in accordance with a first embodiment of the present invention, a particulate material suitable for the removal of heavy metals from an aqueous effluent. The particulate material comprises finely ground peat encapsulated in a microporous shell of a polyvinyl chloride. The shell comprises a sufficient amount of the polyvinyl chloride to utilize the adsorptive qualities of the peat while imparting structural integrity thereto. It is preferable that the material be modified with either a divalent or a monovalent cation in order to enhance the adsorptive qualities of the peat.

In accordance with a second embodiment of the present invention, there is provided a system for removing heavy metals from an aqueous effluent comprising a first column packed with finely ground peat encapsulated in a microporous shell of a polyvinyl chloride and modified with a sodium salt and a second column disposed in series with the first column and packed with finely ground peat encapsulated in a microporous shell of a polyvinyl chloride and modified with a calcium salt.

In accordance with a third embodiment of the present invention, there is provided a particulate material suitable for the removal of heavy metals from an aqueous effluent comprising raw peat modified with a calcium salt.

In accordance with a fourth embodiment of the present invention, there is provided a particulate material comprising a finely ground solid encapsulated in a microporous shell of a polyvinyl chloride.

BRIEF DESCRIPTION OF THE DRAWINGS

The accompanying drawings, which are incorporated in and constitute a part of the specification, illustrate the presently preferred embodiments of the invention, and together with the general description given above and the detailed description of the preferred embodiments given below, serve to explain the principles of the invention.

DESCRIPTION OF THE PREFERRED EMBODIMENTS

Figure 1:
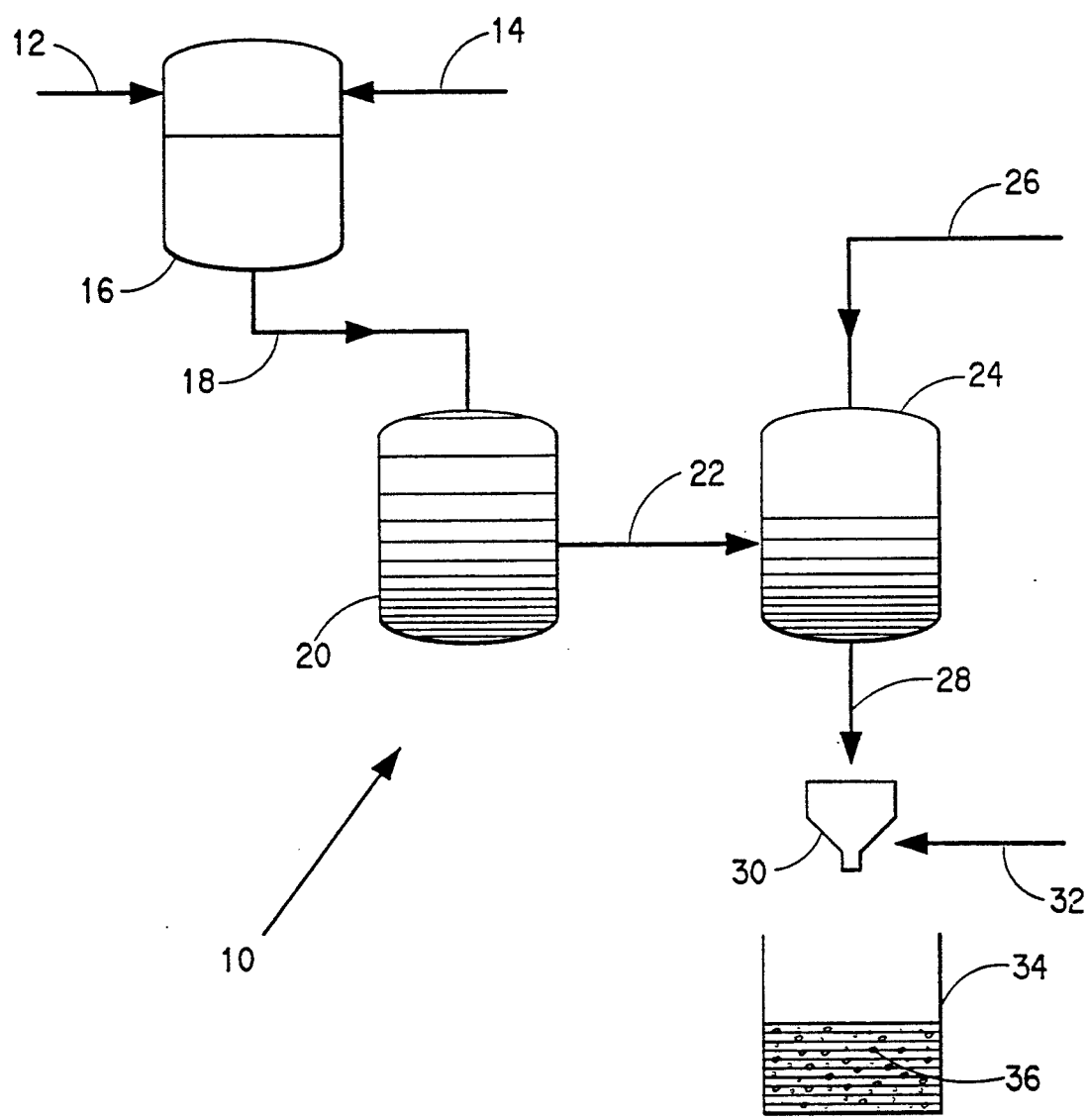
FIG. 1 is a schematic diagram of a system used to make the particulate material according to a first, second and fourth embodiment of the present invention.

Reference will now be made in detail to the present preferred embodiments of the invention as illustrated in the accompanying drawings.

In accordance with a first embodiment of the present invention, there is provided a particulate material suitable for the removal of heavy metals from an aqueous effluent. The particulate material comprises peat. Peat is a known complex organic material which is formed from the partial decomposition of sphagnum moss, sedges, or other bog plants. The principal components of peat are lignin and hemicellulose, most of which eventually break down to humic substances. The molecules of these components bear various polar functional groups, such as phenols, hydroxyls, carboxyls and ketones, which are involved in chemical bonding. Because of the polar nature of these components, peat has a large capacity for adsorbing dissolved metals and polar organic or inorganic molecules.

The peat used in the present invention is finely ground to an average size below about 30 mesh. If the peat is ground much coarser, it is more difficult to encapsulate. Also, coarse peat slows down the adsorption process. Conversely, it is not desirable to grind the peat too finely, since it is uneconomical to grind peat to a size below about 300 mesh.

The peat of the material of the present invention is encapsulated in a microporous shell of a polyvinyl chloride. As noted above, peat, in its raw or unencapsulated form, is stringy, messy and difficult to handle. Also, raw peat has a high hydraulic resistance. Thus, encapsulating the peat makes it much more suitable for use in a column operations. It should be noted that more than one peat particle may be encapsulated in the microporous polyvinyl chloride shell.

Polyvinyl chloride (PVC) is a known polymer having an average molecular weight of about 60,000 to 150,000. Polyvinyl chloride is particularly suitable for encapsulating peat, since it becomes microporous when it is subjected to the process of the present invention for making the particulate material. This process will be described in detail below. In addition, polyvinyl chloride is insoluble in water, yet may be dissolved in selected solvents. Polyvinyl chloride is often applied as a coating by conventional methods. In addition, polyvinyl chloride is relatively inexpensive as compared to other polymers. All of these properties make polyvinyl chloride a particularly desirable encapsulant for peat.

The particulate material of the present invention is used to remove heavy metals from an aqueous effluent. In order to accomplish this removal, it is necessary that the shell be microporous. The upper value for the porosity of the shell is limited only by the structural integrity of the material, since the material will collapse if the shell is too porous. The largest sized micropores practicable must be smaller than the smallest particles of raw peat so that the raw peat is not exuded through the pores after it is encapsulated. The smallest sized micropores may extend into the sub-micrometer range.

The shell of the material of the present invention comprises a sufficient amount of the polyvinyl chloride to utilize the adsorptive qualities of the peat while imparting structural integrity thereto. Thus, the weight percentage of the peat and the polyvinyl chloride is a consideration in the formation of the particulate material Typically, the weight percentage of the polyvinyl chloride in the particulate material is in the range of about 18% to 50%, and is usually in the range of about 20% to 30%. Accordingly, the weight percentage of the peat is in the range of about 50% to 82%, and is usually in the range of about 70% to 80%. If the weight percentage of the peat exceeds about 82%, the particulate material lacks mechanical stability.

The first embodiment of the present invention further includes a process for making a particulate material suitable for the removal of heavy metals from an aqueous effluent. The system used to perform this process is shown generally at 10 in FIG. 1. The process comprises the step of dissolving a polyvinyl chloride in an organic solvent therefor to produce a polymer solution. The preferred organic solvent for use with the present invention is dimethylacetamide (DMAC), which is a known organic solvent and which is miscible with water and with most other organic solvents. Other organic solvents may be used, such as dimethylformamide (DMF). DMF is also a known organic solvent which is also miscible with water and most other organic solvents. As shown in FIG. 1, the organic solvent is admitted through a first inlet conduit 12, and the polyvinyl chloride is admitted through a second inlet conduit 14 into a first dissolver 16.

The process of the present invention further comprises the step of combining the polymer solution with peat to produce a homogeneous dispersion of peat in the polymer solution. The peat is first ground to an average size below about 30 mesh. As shown in FIG. 1, the polymer solution is discharged from first dissolver 16 through a first outlet conduit 18 into a second dissolver 20, where it is combined with the peat. A second outlet conduit 22 is disposed in communication with second dissolver 20 for discharging the dispersion into a tank 24. Tank 24 is supplied with pressurized air from a pressurized air line 26.

The process of the present invention also comprises the step of forming droplets from the dispersion. For this purpose, a nozzle 30 is provided at the end of a tube 28, which is disposed in fluid communication with tank 24. The dispersion is continuously discharged from tank 24 through tube 28 in a steady stream into nozzle 30. The step of forming droplets from the dispersion includes atomizing the dispersion with a stream of gas, in which case nozzle 30 is an atomizing nozzle. The gas is preferably air from an air jet 32 which contacts the homogeneous dispersion as the dispersion flows through the nozzle. As the dispersion leaves nozzle 30 and contacts the atmosphere, droplets of the dispersion are formed. This method is preferred for making relatively small particles of the material. Although a nozzle is described above for forming droplets from the dispersion, other devices may be used for forming the droplets without departing from the scope or spirit of the invention. For example, a tube, which is equivalent to the nozzle as described, but which does not require a secondary air source for atomization, may be used for forming the particles. Alternatively, a syringe or a pipette may be used to meter out the droplets when making relatively coarse particles of the material.

The process of the present invention also comprises the step of contacting the droplets with water to precipitate out a particulate material comprising finely ground peat encapsulated in a microporous shell of polyvinyl chloride. As shown in FIG. 1, a water bath 34 is disposed under nozzle 30, so that as the droplets exit the nozzle, they are jetted into the water bath. On contact with the water, the organic solvent rushes out of the polymer solution. Since the polyvinyl chloride does not dissolve in water, a particulate material, shown at 36 in FIGS. 1 and 2, comprising peat encapsulated in a microporous shell of polyvinyl chloride precipitates out of the water.

The process for making the particulate material of the first embodiment of the present invention also includes the step of modifying the peat before the combining step, or modifying the particulate material after the contacting step. The modification improves the adsorptive qualities of the peat. In either case, the modification is effected in the same manner, but for the sake of simplification, the modification will be discussed with respect to the particulate material only. In one preferred modification of the material of the first embodiment, the particulate material is modified with a divalent cation. Preferably, the divalent cation is introduced as a calcium salt, and further preferably, the calcium salt is calcium carbonate ($CaCO_3$). The particulate material is modified by first washing it with a weak mineral acid. Calcium carbonate is then added to the washed particulate material. Optionally, the particulate material may be rinsed with water after it is washed with the mineral acid. As an additional step, the washed particulate material and the calcium carbonate may then be titrated with sodium hydroxide.

In another preferred modification of the material of the first embodiment, the particulate material is modified with a monovalent cation. Preferably, the monovalent cation is introduced as a sodium salt, and further preferably, the sodium salt is sodium hydroxide (NaOH). The particulate material is modified by first washing it with a weak mineral acid. Sodium hydroxide is then added to the washed particulate material. Optionally, the particulate material may be rinsed with water after it is washed with the mineral acid.

Further in accordance with the first embodiment of the present invention, there is provided a process for removing heavy metals from an aqueous effluent. The process comprises the step of contacting the effluent with a particulate material comprising finely ground peat encapsulated in a microporous shell of a polyvinyl chloride.

The particulate material used in the above-described process may be modified after it is encapsulated and before the effluent contacts the material. Alternatively, the peat of the particulate material may be modified before it is encapsulated and before the effluent contacts the material. In any of the above-described scenarios of modifying the particulate material or the peat, the particulate material may be modified with either a divalent or a monovalent cation. In the former case, the divalent cation is preferably introduced as a calcium salt, where the calcium salt is preferably calcium carbonate. In the latter case, the monovalent cation is preferably introduced as a sodium salt, where the sodium salt is preferably sodium hydroxide. The steps for modifying the particulate material or the peat are the same as those outlined above in the description of the process for making and modifying the particulate material.

A system for removing heavy metals from an aqueous effluent which uses the particulate material according to the first embodiment of the present invention is illustrated generally at 40 in FIG. 2. The effluent is stored in a vessel 42 and is pumped from vessel 42 by a first pump 44 through a first supply conduit 46 into a column 48. Column 48 includes an inlet port 48*a* and an exit port 48*b*. Column 48 is packed with a particulate material 36 as described above and which is made by the process as described above. A portion of the effluent exiting column 48 is sampled at exit port 48*b* and analyzed off-line by a device (not shown) for measuring the concentration of the heavy metal in the effluent. A meter 50 for measuring the pH of the effluent at exit port 48*b* is provided in a discharge conduit 52. The effluent is temporarily stored in a receptacle 54 for either further processing or disposal in a bio pond.

After the effluent has passed through column 48 for a long period of time, the particulate material has adsorbed much of the heavy metal and begins to leak some of it. At this time, the adsorption cycle is terminated, and the adsorbed metal must be removed during the desorption cycle. For this purpose, a second pump 58 pumps a desorbing solution, such as weak hydrochloric acid (HCl), from a second vessel 56 into column 48 via a second conduit 64 to desorb or elute the heavy metals from the particulate material. A third pump 62 pumps a liquid, such as water, from a third vessel 60 into column 48 via a third conduit 66 to wash away the free acid in the column. A fourth pump 68 pumps either a divalent or a monovalent cation, which is introduced as either calcium carbonate or sodium hydroxide, respectively, into column 48 from a fourth vessel 70 via a conduit 72 to restore the adsorptive qualities of the peat. Fourth pump 68, fourth vessel 70 and conduit 72 are included only when the peat is to be modified. After the particulate material has been modified, a new supply of effluent is pumped in by first pump 44 to begin the adsorption and desorption process once again.

The system of FIG. 2 is provided for illustrative purposes only. Thus, the material of the first embodiment of the present invention may be used in other systems instead of the above-described column system, such as a continuous, single-stage, or stirred reactor, without departing from the scope of spirit of the invention.

In accordance with a second embodiment of the present invention, there is provided a system for removing heavy metals from an aqueous effluent. Such a system is shown generally at 70 in FIG. 3. System 70 comprises a first column 72 packed with finely ground peat encapsulated in a microporous shell of a polyvinyl chloride and modified with a sodium salt, where the encapsulated and modified peat is shown at 74. The sodium salt is preferably sodium hydroxide. The peat is modified by washing it with a weak mineral acid. Sodium hydroxide is then added to the washed peat. Optionally, the peat may be rinsed with water after it is washed with the mineral acid.

Figure 3:
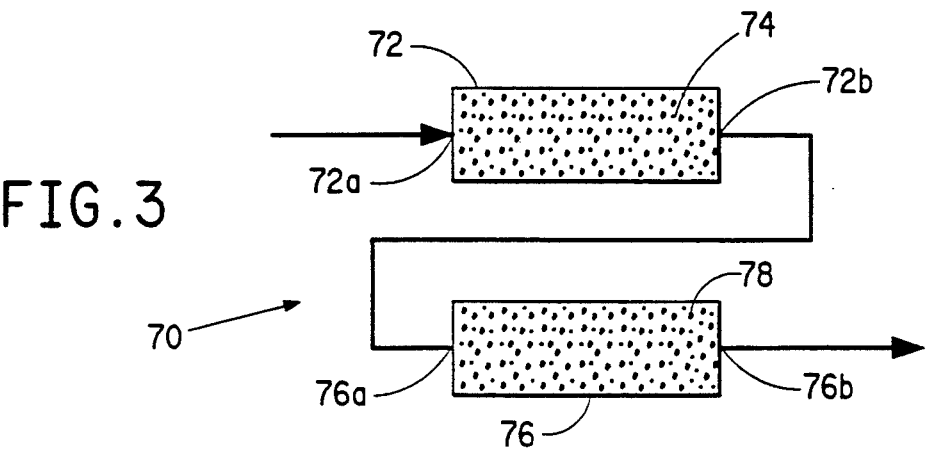
FIG. 3 is a schematic diagram of an adsorption and desorption system which uses the particulate material according to a second embodiment of the present invention.

System 70 also comprises a second column 76 disposed in series with first column 72 as shown in FIG. 3 and packed with finely ground peat encapsulated in a microporous shell of a polyvinyl chloride and modified with a calcium salt, where the modified peat is shown at 78. The calcium salt is preferably calcium carbonate. The peat in second column 76 is modified by first washing it with a weak mineral acid. Calcium carbonate is then added to the washed peat. Optionally, the peat may be rinsed with water after it is washed with the mineral acid. As an additional step, the washed peat and the calcium carbonate may be titrated with sodium hydroxide.

First column 72 comprises an inlet 72a and an outlet 72b. Second column 76 comprises an inlet 76a and an outlet 76b. First column 72 is exposed to the high-metal concentrations of raw wastewater at inlet 72a and exhibits high loading capacities for high-metal concentrations in the effluent. As shown in FIG. 3, the exit stream from outlet 72b of first column 72 is fed to inlet 76a of second column 76. Second column 76 further removes heavy metals from an effluent and discharges clean water at outlet 76b. Second column 76 exhibits a better performance compared to first column 72 at the lower end of metal concentrations, and first column 72 exhibits a better performance compared to second column 76 at the higher end of metal concentrations.

Further in accordance with the second embodiment of the present invention, there is provided a process for removing heavy metals from an aqueous effluent. The process comprises passing the effluent through a first column, such as column 72, packed with finely ground peat encapsulated in a microporous shell of a polyvinyl chloride and modified with a sodium salt, such as encapsulated, modified peat 74. The process also comprises passing the effluent through a second column, such as 76, packed with finely ground peat encapsulated in a microporous shell of a polyvinyl chloride and modified with a calcium salt, such as encapsulated, modified peat 78. The heavy metals are thereby removed from the aqueous effluent, utilizing the performance of the modified, encapsulated peat. The peat is modified as described above with respect to system 70.

In accordance with a third embodiment of the present invention there is provided a particulate material suitable for the removal of heavy metals from an aqueous effluent. The particulate material comprises raw peat modified with a calcium salt. Preferably, the calcium salt is calcium carbonate. The material of the third embodiment of the present invention may be used in a system such as that shown in FIG. 2 to adsorb and desorb heavy metals from an aqueous effluent. Alternatively, the material of the third embodiment may be used in other systems, such as a continuous, single-stage, or stirred reactor, instead of a column.

In accordance with the third embodiment of the present invention, there is provided a process for making a particulate material suitable for the removal of heavy metals from an aqueous effluent. The process comprises the step of modifying raw peat with a calcium salt. The modifying step comprises the sub-steps of washing peat with a weak mineral acid and adding calcium carbonate to the washed peat to form the particulate material. Optionally, the washed peat may be rinsed with water before the calcium carbonate is added to it. As an additional step, the rinsed peat and the calcium carbonate may be titrated with sodium hydroxide.

In accordance with a fourth embodiment of the present invention there is provided a particulate material which comprises a finely ground solid encapsulated in a microporous shell of a polyvinyl chloride. The particulate material of this embodiment has ion exchange properties, adsorptive properties and/or catalytic properties which make it particularly suitable for the removal of heavy metals or undesirable chemicals from an aqueous effluent. The porosity of the microporous shell and the porosity of the solids are in the range of 10% to 80%. It is desirable for the material to be as porous as possible, so that the rate of ion exchange is maximized. However, if the material is too porous, i.e., if the porosity exceeds the upper end of this range, it loses mechanical strength. On the other hand, below the lower end of this range, the kinetics of the ion exchange are sacrificed.

Encapsulation of the finely ground solid in a polyvinyl chloride, which is a relatively inexpensive polymer, makes this material economically attractive. Either dimethylacetamide (DMAC) or dimethylformamide (DMF) may be used in the encapsulation process. The finely ground solid may comprise peat, where the peat is treated with calcium carbonate. This treatment of peat with calcium carbonate may be done either before or after the encapsulation process.

In accordance with the fourth embodiment of the present invention, there is provided a process for making a particulate material. The material may be made with a system such as that shown in FIG. 1. The process comprises the steps of dissolving a polyvinyl chloride with an organic solvent therefor to produce a polymer solution. The polyvinyl chloride is dissolved in either dimethylacetamide (DMAC) or dimethylformamide (DMF). The polymer solution is then combined with a finely ground solid to produce a homogeneous dispersion. Droplets are then formed from the dispersion. The droplets are then contacted with water to precipitate out a particulate material comprising a finely ground solid encapsulated in a microporous shell of the polyvinyl chloride. The process of the fourth embodiment of the present invention is a simple and speedy process in which a relatively inexpensive polymer is used and in which there is no by-product formation.

The finely ground solid may be modified before the polymer solution is combined therewith to produce the homogeneous dispersion. Alternatively, the particulate material may be modified after the contacting step of the process of the present invention. In either case, when the finely ground solid comprises peat, it may be modified with calcium carbonate.

In accordance with the fourth embodiment of the present invention, there is provided a process for removing heavy metals from an aqueous effluent. The process comprises the step of contacting the effluent with a particulate material comprising a finely ground solid encapsulated in a microporous shell of a polyvinyl chloride. The process of the fourth embodiment of the present invention may be carried out in a system such as that shown in FIG. 2.

The invention will be further clarified by the following examples, which are intended to be purely exemplary of the invention.

EXAMPLE 1

This Example describes the formation of a particulate material and obtaining the $Ni++$ uptake kinetics of this material. The particulate material comprised peat encapsulated in a polyvinyl chloride using DMAC as a solvent and modified with calcium carbonate. To prepare the polymer solution, 100 g. of polyvinyl chloride from Aldrich Chemical Company, Inc. of Milwaukee, Wis. and 1000 cm.$^3$ of DMAC from EM Science, a division of EM Industries, Inc., of Gibbstown, N. J., were combined in a glass bottle. The bottle was capped and placed on a roller overnight. A clear polymer solution resulted. Then, 250 cm.$^3$ of the polymer solution was combined with 150 cm.$^3$ DMAC in a glass beaker and 100 g. of dried, pulverized peat admixed. A smooth, lump-free peat slurry was obtained.

The peat slurry was pumped continuously through a nozzle 1 mm. in diameter and jetted directly into a water bath. Solid particles formed instantly, consisting of 80% peat immobilized by 20% PVC. No peat or polymer fines were lost in the process. To obtain round particles of rather uniform size, the nozzle had to be placed at some distance above the water bath. This distance was adjusted visually to allow the slurry jet to disintegrate into individual droplets before it was allowed to contact the water surface. That distance was adjusted from 15.2 cm. to 61 cm. and depended on feed rates and slurry viscosity. This liquid jet technique produced coarse particles with the following size distribution:

TABLE 1

| Particle Diameter (mm.) | Particle Volume (cm.$^3$) |
| --- | --- |
| >4 | 3.3 |
| 3–4 | 250 |
| 2–3 | 175 |
| 1.5–2 | 3.3 |
| <1.5 | 0 |

Particle surfaces were inspected by a scanning electron microscope. At 3000× magnification, micropores were clearly visible. They ranged in size from less than a micrometer to several micrometers in diameter. The particles were cross-sectioned and inspected microscopically. At 300× magnification, the porous structure of the particle interior became clearly visible. Particle porosity exceeded 50%.

The peat within the microporous shell of polyvinyl chloride was then modified. To accomplish this, 2.96 g. of particles (3 to 4 mm. size fraction) were placed in a plastic beaker. The particles were soaked for several hours in 1 N HCl, rinsed with distilled water and titrated with $CaCO_3$ so that the pH was in the range of about 6.0 to 6.5. The final pH was adjusted with NaOH to about 7. The resulting product was termed CaPEAT.

Figure 4:
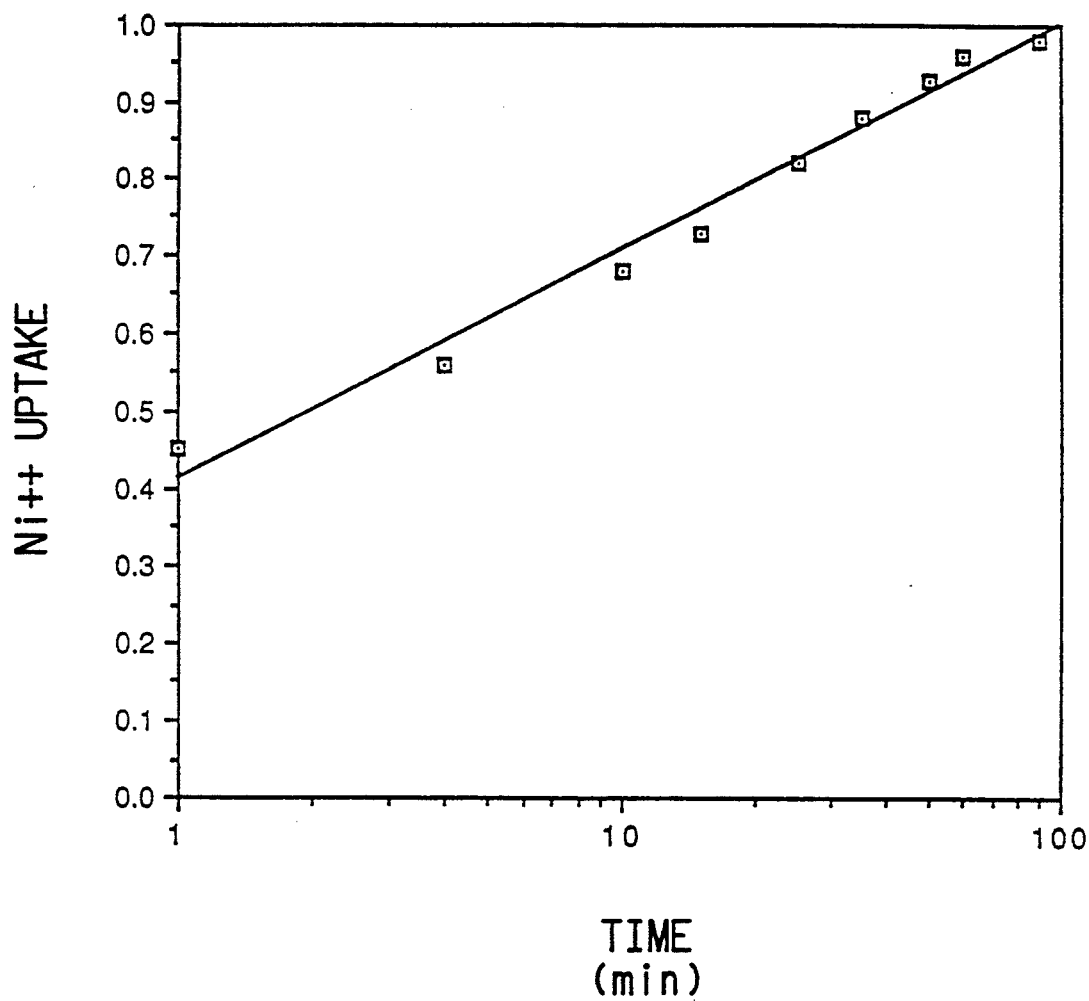
FIG. 4 is a graph showing the nickel ion uptake over time of a particulate material as described in Example 1.

$Ni++$ kinetics were measured as follows. One hundred cm.$^3$ of double distilled water were added to the CaPEAT particles and agitated vigorously. At the start of the experiment, 10 mg. of $Ni++$ as $NiCl_2$ were quickly added to the double distilled water and CaPEAT, and liquid samples were drawn periodically. The results are shown in FIG. 4.

$Ni++$ adsorption was 90% complete with 45 minutes. For size fractions other than 3 to 4 mm., the following times for 90% uptake were observed:

TABLE 2

| Mean Particle Diameter (mm.) | Time to 90% Uptake (min.) |
| --- | --- |
| 1.7 | 5 |
| 2.4 | 14 |
| 3.35 | 45 |
| 4.75 | 50 |

EXAMPLE 2

This Example describes the formation of relatively small size particles, compared to those formed in Example 1, of a particulate material and obtaining the $Ni++$ uptake kinetics of this material. The particulate material comprised peat encapsulated in a shell of a polyvinyl chloride formed using DMAC as a solvent and modified with calcium carbonate. The relatively small peat particles of this Example further enhanced $Ni++$ uptake rates and were produced by an atomization technique. Peat slurry prepared as described in Example 1 was fed through a Teflon line which had a 1 mm. inner diameter and a 4 mm. outer diameter into an atomizing nozzle in a system as shown in FIG. 1. The air pressure was set at 31 kPa. Fine droplets thus produced were directed into a water bath. On contact, the droplets transformed instantly into porous, solid particles. Virtually all the peat was formed into encapsulated beads by this process, and little polymer was lost.

The solid product was sieved and the size distribution measured as shown below:

TABLE 3

| Diameter (mm.) | Fraction (%) |
| --- | --- |
| 4.75 | 0 |
| 3.35 | 0 |
| 2.36 | 0 |
| 1.70 | 0 |
| 1.00 | 20 |
| 0.425 | 80 |

The particles contained 80% peat and 20% PVC. They were inspected by a scanning electron microscope, and their surfaces clearly showed microporous pores. The particles were converted to CaPEAT as described above in Example 1.

Figure 5:
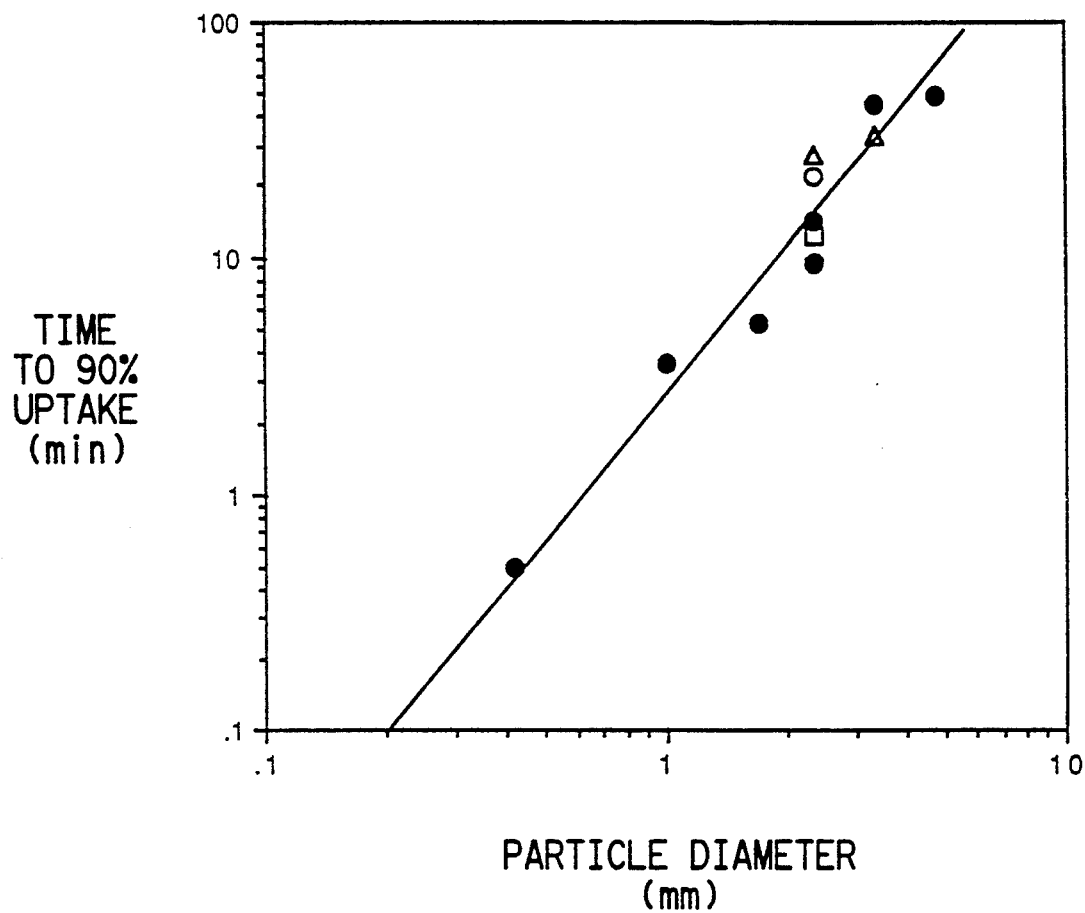
FIG. 5 is a graph showing the Ni++ uptake kinetics as a function of particle diameter as described in Example 2.

$Ni++$ uptake kinetics were measured for the 1.00 mm. and 0.4 mm. size fractions, respectively. For the 1 mm. particles, $Ni++$ uptake was 90% complete within 3.6 minutes, and for the 0.4 mm particles, within 0.5 minutes. A summary of all kinetic results is shown in FIG. 5. As shown in FIG. 5, time to 90% completion varied with the square of the particle diameter, suggesting intra-particle diffusion as the rate-limiting step.

EXAMPLE 3

This Example describes a column experiment using a particulate material comprising peat encapsulated in a microporous shell of a polyvinyl chloride formed using DMAC as a solvent and modified with calcium carbonate. The column experiment demonstrates the loading-elution performance of the material. A system such as that shown generally at 40 in FIG. 2 was used to perform this column experiment. Particulate material which was prepared as described in Example 1 was sieved, and 43 cm.³ of this material (6.4 g. of the 1 to 1.7 mm. size fraction) were added to a glass column which was 1.5 cm. in diameter and 28 cm. long. The bed of particulate material was washed for two hours with 1 N HCl, rinsed with double distilled water and washed for 15 minutes with a calcium carbonate slurry with a concentration of 3 g. CaCO₃/liter. The bed was allowed to soak for 1 hour.

Figure 2:
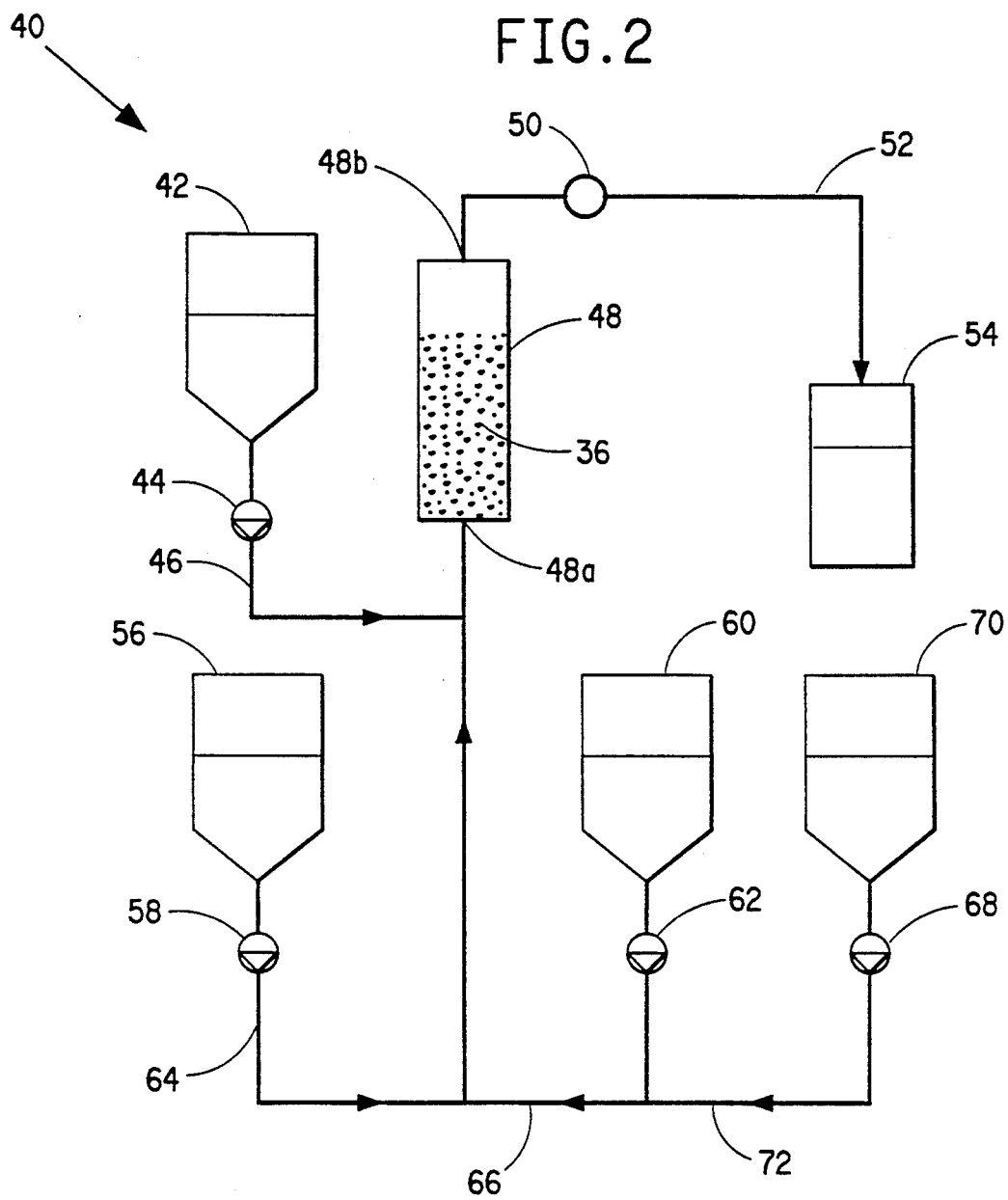
FIG. 2 is a schematic diagram of an adsorption and desorption system which uses the material of any of the first, second or third embodiments of the present invention.
Figure 6:
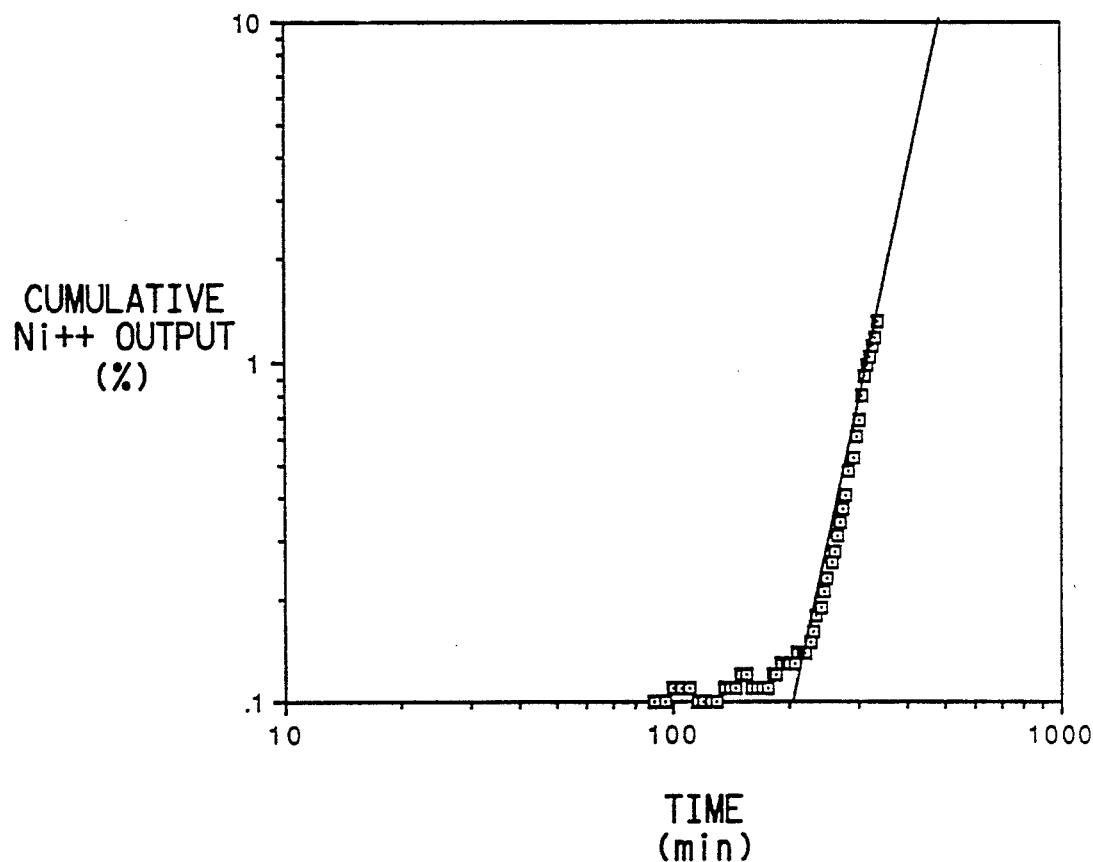
FIG. 6 is a graph showing Ni++ leakage from a column during the loading cycle as described in Example 3.

A nickel chloride solution containing 500 ppm. $Ni^{++}$ in deionized water was prepared and fed at a constant rate of 0.8 cm.³/min. to the bottom of the column. Liquid samples were taken periodically and measured for $Ni^{++}$. The results of this measurement are shown in FIG. 6. FIG. 6 shows how much $Ni^{++}$ leaked from the column over time. For the first three hours, essentially no $Ni^{++}$ escaped from the column. After four hours of operation, the column's capacity to bind $Ni^{++}$ was exceeded, and consequently, the exit concentration rose exponentially. The pump for delivering $Ni^{++}$ into the column, such as pump 44 as shown in FIG. 2, was stopped when $Ni^{++}$ leakage amounted to 1.3%. At that time, the mean $Ni^{++}$ concentration on the peat amounted to 25,000 ppm.

Figure 7:
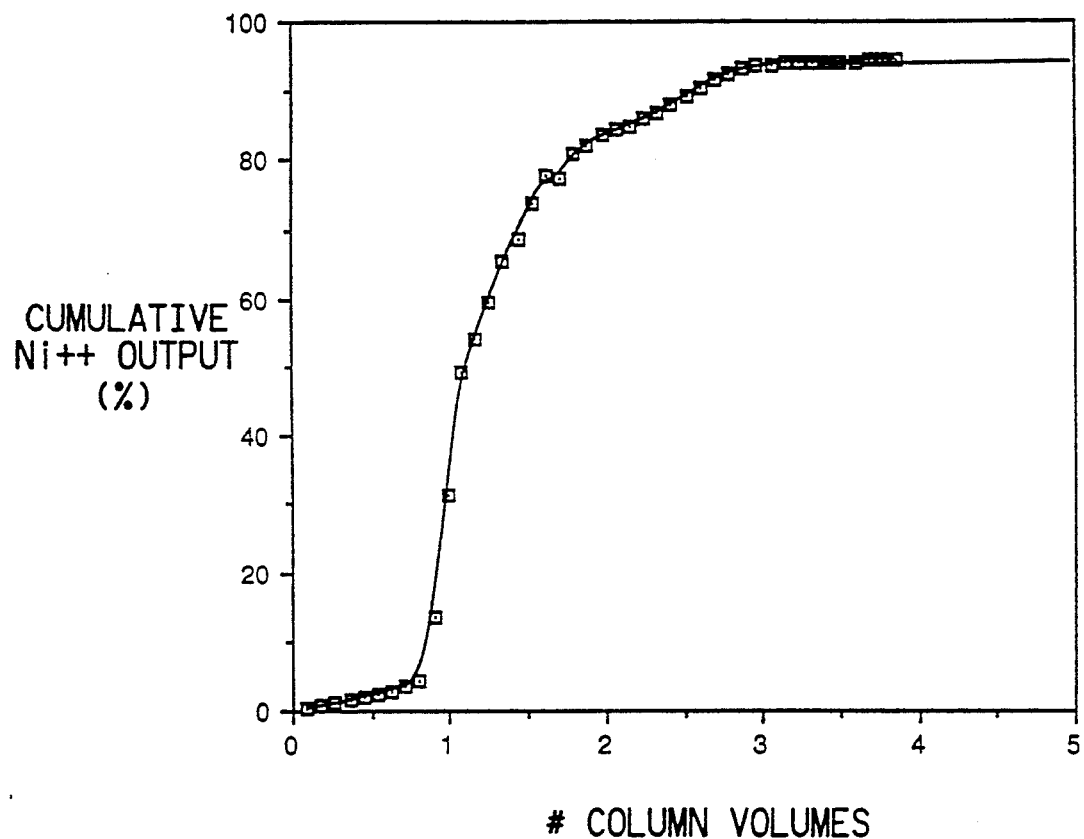
FIG. 7 is a graph showing Ni++ release from a column during the desorption cycle during which a dilute mineral acid is used as described in Example 3.

To desorb $Ni^{++}$ from the bed of particulate material, 1 N HCl was pumped at a rate of 0.9 cm.³/min. to the column inlet. The $Ni^{++}$ concentration at the column exit was monitored. FIG. 7 shows the percentage of the $Ni^{++}$ released from the column as a function of acid through-put, designated by the number of column volumes. $Ni^{++}$ concentration in the effluent increased steeply after one column volume of dilute acid entered the column. Three column volumes of dilute acid were sufficient to free 95% of all the $Ni^{++}$ originally bound to the particles in the column.

Figure 8:
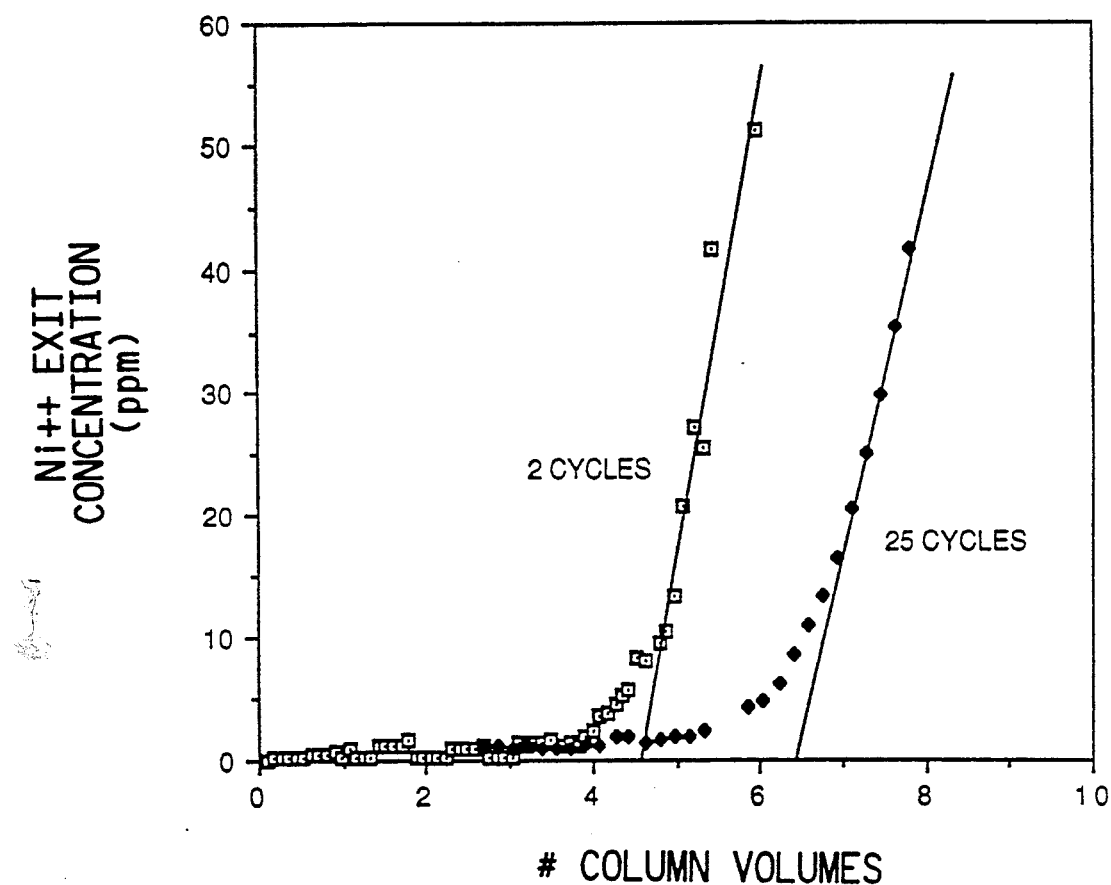
FIG. 8 is a graph showing two nickel ion breakthrough profiles for the particulate material as described in Example 3.

Column operation was continued for an extended period of time in order to assess column longevity. The column was cycled repeatedly through all four phases of operation (i.e., $Ni^{++}$ loading, acid washing, water rinsing, and CaCO₃ conditioning). Each cycle required eight hours for completion. Switching of the operation of the pumps which admit desorbing solution, water and calcium carbonate, such as those shown in FIG. 2, was controlled by a computer. $Ni^{++}$ breakthrough profiles are shown in FIG. 8. The left-most curve as shown in FIG. 8 was measured early on, i.e., after completion of two cycles, and the right-most curve was measured after 25 cycles were completed. As can be seen from FIG. 8, performance improved with time.

EXAMPLE 4

This Example describes the formation of a particulate material and obtaining the uptake kinetics of this material. The particulate material comprised peat encapsulated in a microporous shell of a polyvinyl chloride formed using DMF as a solvent and modified with calcium carbonate. To prepare the polymer solution, 25 g. of PVC were admixed with 250 cm.³ of DMF, commercially available from J. T. Baker, Inc. of Phillipsburg, N. J., and stirred overnight. The PVC dissolved only partially. Then, 50 cm.³ of the solution PVC and DMF were mixed with 20 g. of dried peat and an additional 25 cm.³ of DMF. A smooth slurry resulted, which was taken up by a syringe and injected into a water bath from 45.7 cm. above the water surface. On contact, solid particles of particulate material formed instantly. The following size distribution was measured:

TABLE 4

| Pellet Diameter (mm.) | Volume Fraction (%) |
| --- | --- |
| 4.75 | 0.5 |
| 3.35 | 39.7 |
| 2.36 | 59.6 |
| 1.7 | 0.1 |
| 1.0 | 0.0 |

Figure 9:
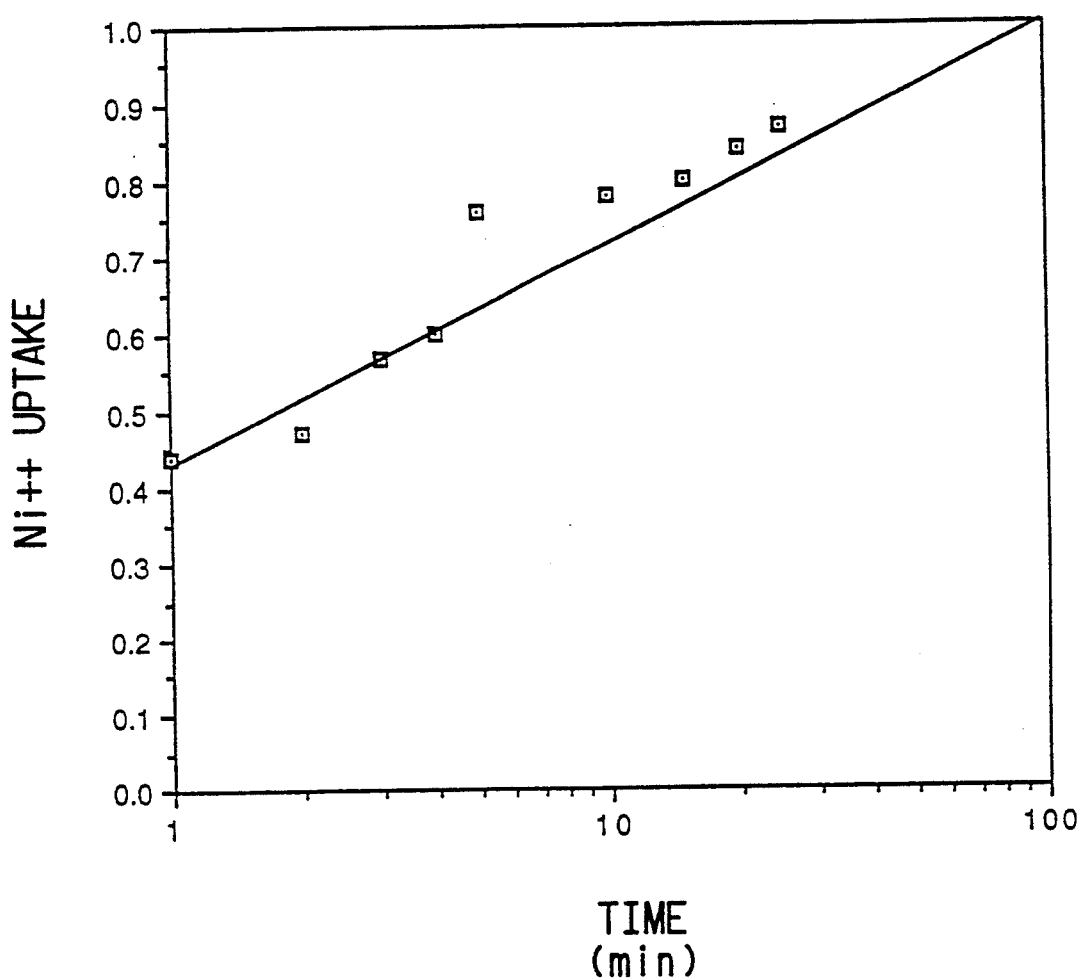
FIG. 9 is a graph showing the nickel ion uptake over time of a particulate material as described in Example 4.

The peat contained in this particulate material was converted to CaPEAT according to the procedure as described in Example 1. Then, $Ni^{++}$ uptake kinetics were measured in the manner described in Example 1, and 2.96 g. of the CaPEAT (2.36 mm. size fraction) were slurried into 100 cm.³ of double distilled water. Initially, 10 mg. of $Ni^{++}$ were added as NiCl₂ to the slurry, and liquid samples were drawn periodically and analyzed. The results are shown in FIG. 9. As can be seen from FIG. 9, $Ni^{++}$ adsorption for the particulate material was 90% complete within 28 minutes.

EXAMPLE 5

Figure 10:
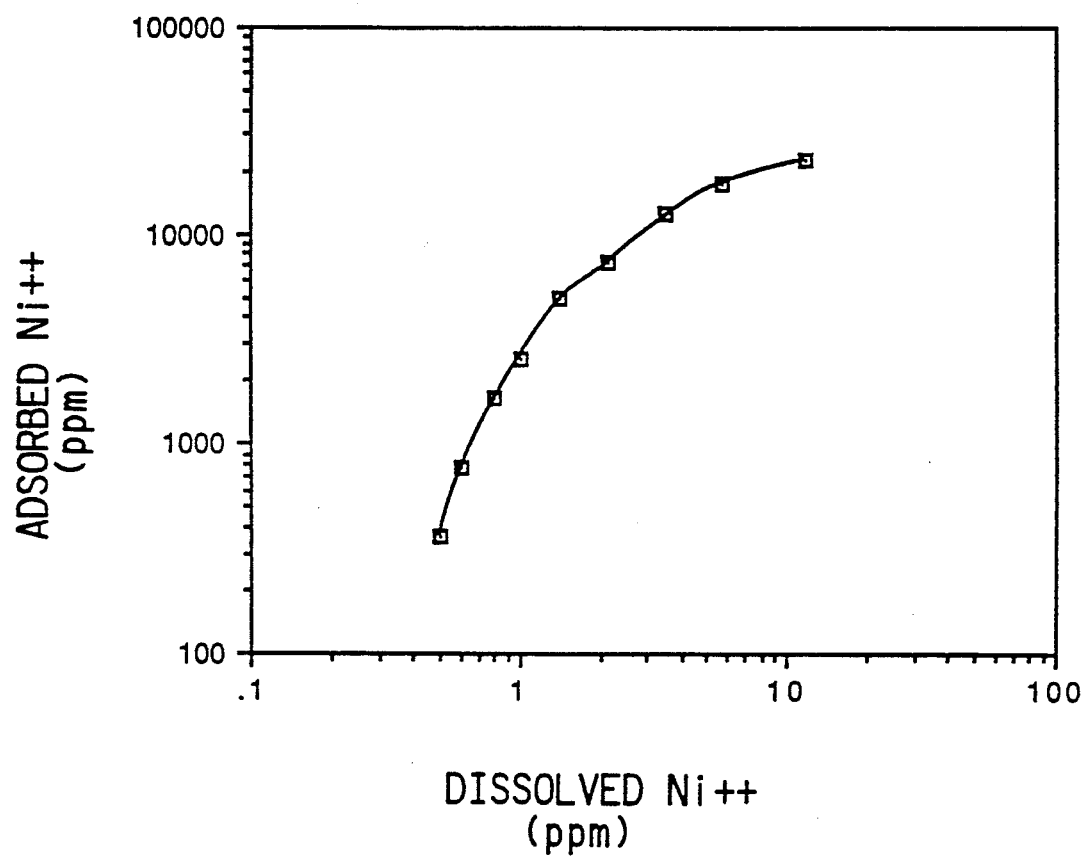
FIG. 10 is a graph showing the amount of nickel ions adsorbed as a function of dissolved nickel ions for unmodified peat of the prior art as described in Example 5.

In this Example, the adsorption isotherm for $Ni^{++}$ and virgin (i.e., unmodified) sphagnum peat was measured. In order to do this, 2.5 g. of dried peat were added to 300 cm.³ of distilled water and agitated. $Ni^{++}$ (as NiCl₂) was added incrementally to the resultant peat slurry. Samples were taken and analyzed for dissolved $Ni^{++}$. The amount of dissolved $Ni^{++}$ was subtracted from the amount of $Ni^{++}$ added to determine the amount of $Ni^{++}$ adsorbed. The results are shown in FIG. 10. The amount of $Ni^{++}$ adsorbed was measured beginning at about 0.5 ppm. $Ni^{++}$ as shown in FIG. 10. This is because it is difficult to polish waste streams below this value, since the amount of $Ni^{++}$ retained by the virgin peat is small.

EXAMPLE 6

Figure 11:
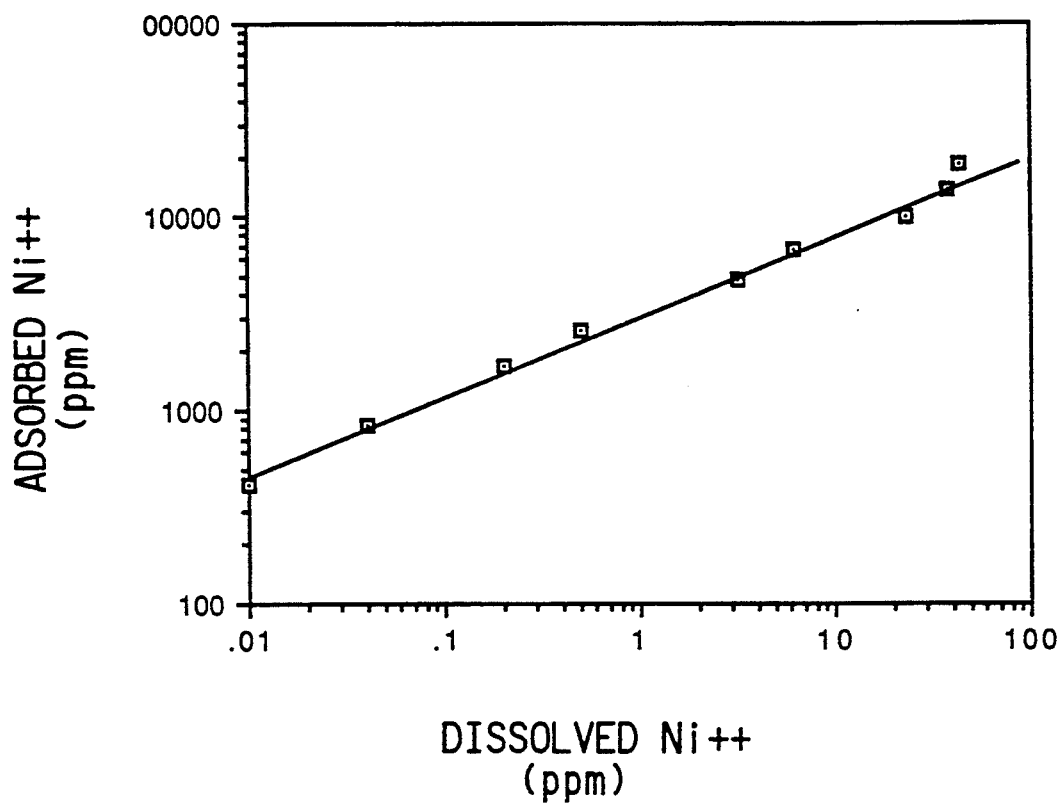
FIG. 11 is a graph showing the amount of nickel ions adsorbed as a function of dissolved nickel ions for calcium-modified peat as described in Example 6.
Figure 12:
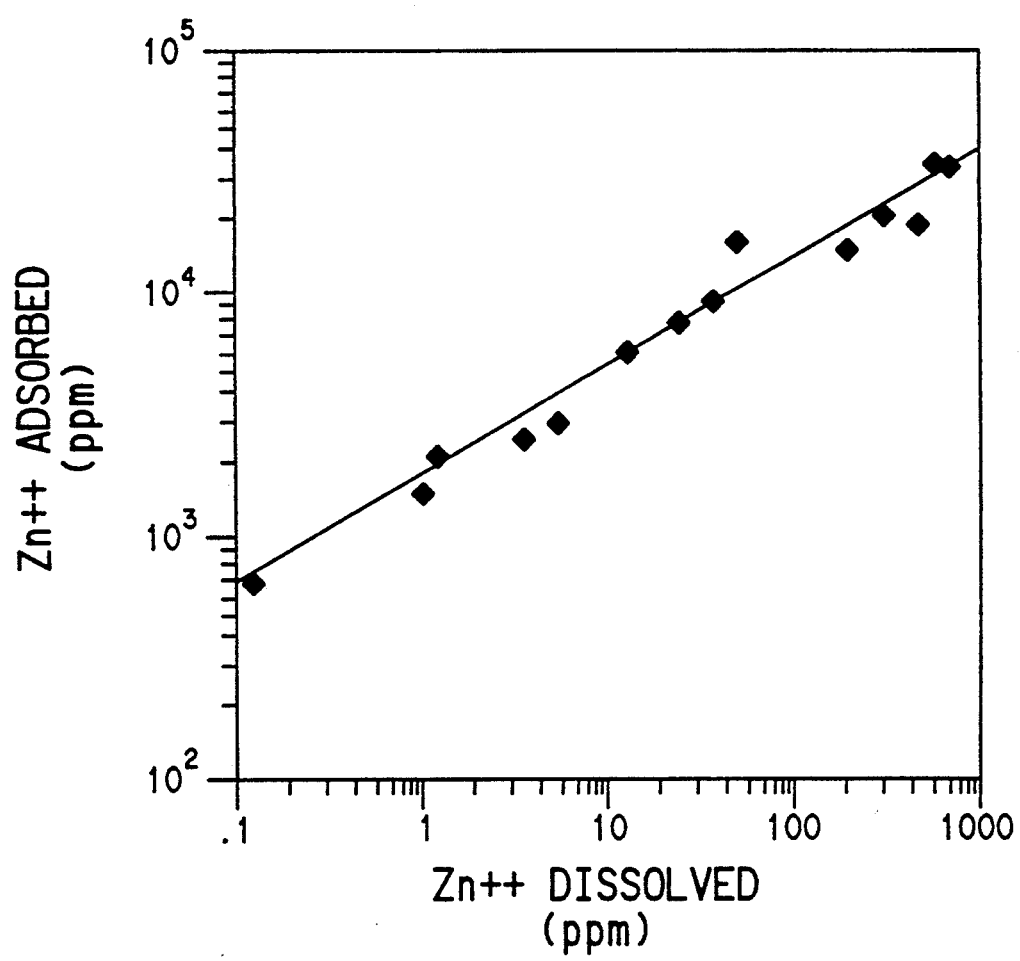
FIG. 12 is a graph showing the amount of zinc ions adsorbed as a function of dissolved zinc ions for calcium modified peat as described in Example 6.

In this Example, the adsorption isotherm for $Ni^{++}$ for calcium-modified peat (CaPEAT) of the third embodiment of the present invention was measured. As in above Example 5, virgin peat was slurried into 1 N HCl. The peat slurry was rinsed with distilled water and titrated with CaCO₃ to a pH of about 6 to 6.5. The titrated peat was further titrated with NaOH to a pH of about 7.0. The resultant peat was termed CaPEAT. $Ni^{++}$ was added incrementally to the CaPEAT to obtain the adsorption isotherm for $Ni^{++}$ for this modified peat. The adsorption isotherm is shown in FIG. 11. As can be seen from FIG. 11, CaPEAT is quite suitable for $Ni^{++}$ polishing well below 0.1 ppm., because it offers superior $Ni^{++}$ binding properties. The same is true for $Zn^{++}$, as can be seen from FIG. 12, which shows the adsorption isotherm for zinc for CaPEAT.

Additional advantages and modifications will readily occur to those skilled in the art. The invention in its broader aspects is therefore, not limited to the specific details, representative apparatus and illustrative examples shown and described. Accordingly, departures may be made from such details without departing from the spirit or scope of the general inventive concept as defined by the appended claims and their equivalents.

I claim:

1. A particulate material suitable for the removal of heavy metals from an aqueous effluent, comprising: peat finely ground to an average size below about 30 mesh encapsulated in a microporous shell of a polyvinyl chloride, wherein the weight percentage of the peat is less than 82%.

2. The particulate material of claim 1, wherein the shell comprises a sufficient amount of the polyvinyl chloride to utilize the adsorptive qualities of the peat while imparting structural integrity thereto.

3. The particulate material of claim 2, wherein the weight percentage of the polyvinyl chloride is in the range of about 18% to 50%.

4. The particulate material of claim 3, wherein the weight percentage of the polyvinyl chloride is in the range of about 20% to 30%.

* * * * *